US008812425B2

(12) United States Patent
Nath

(10) Patent No.: US 8,812,425 B2
(45) Date of Patent: Aug. 19, 2014

(54) METHOD FOR RULE-BASED CONTEXT ACQUISITION

(75) Inventor: Suman Nath, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 267 days.

(21) Appl. No.: 13/325,874

(22) Filed: Dec. 14, 2011

(65) Prior Publication Data

US 2013/0159237 A1 Jun. 20, 2013

(51) Int. Cl.
*G06F 17/00* (2006.01)
*G06N 5/02* (2006.01)

(52) U.S. Cl.
CPC ..................................... *G06N 5/025* (2013.01)
USPC .......................................................... 706/47

(58) Field of Classification Search
None
See application file for complete search history.

(56) References Cited

U.S. PATENT DOCUMENTS

| | | | |
|---|---|---|---|
| 7,778,632 | B2 | 8/2010 | Kurlander et al. |
| 2003/0065501 | A1 | 4/2003 | Hamdan |
| 2008/0077661 | A1 | 3/2008 | Jeon et al. |
| 2009/0125918 | A1 | 5/2009 | Kansal et al. |
| 2009/0328012 | A1 | 12/2009 | Aharoni et al. |
| 2010/0306711 | A1 | 12/2010 | Kahn et al. |
| 2011/0078758 | A1 | 3/2011 | Kohlenberg et al. |
| 2011/0161076 | A1* | 6/2011 | Davis et al. .................... 704/231 |
| 2011/0231355 | A1 | 9/2011 | Lee |
| 2012/0208592 | A1* | 8/2012 | Davis et al. ................. 455/556.1 |

OTHER PUBLICATIONS

"International Search Report", Mailed Date: Jun. 12, 2013, Application No. PCT/US2012/069950, Filed date: Dec. 14, 2012, pp. 9.
Floreen, et al., "Context-Aware Methods Course on Context-Aware Computing 2003", Retrieved at <<http://s3.amazonaws.com/academia.edu.documents/3440129/Context_Memory_and_Shared_Context_In_Mobile_Devices.pdf?AWSAccessKeyId=AKIAIGQICEMJ5UHTFFWA&Expires=1317273434&Signature=v5Q8mHCfcdYcFZYGXqrmX9JwVyU%3D>>, University of Helsinki, 2003, pp. 103.
Kang, et al., "SeeMon: Scalable and Energy-efficient Context Monitoring Framework for Sensor-rich Mobile Environments", Retrieved at <<http://nclab.kaist.ac.kr/papers/Conference/mobisys08-SeeMon.pdf>>, Proceeding of the 6th international conference on Mobile systems, applications, and services (MobiSys), Jun. 17-20, 2008, pp. 267-280.

(Continued)

*Primary Examiner* — Alan Chen
(74) *Attorney, Agent, or Firm* — Steve Wight; Brian Haslam; Micky Minhas

(57) ABSTRACT

Methods and systems for rule-based context acquisition are disclosed herein. The method includes accepting a request for target context from an application at a context acquisition system and identifying context rules relating to the target context using a rule-based inference cache. The method also includes determining an inferred value of the target context based on previously-acquired contexts and the context rules. If the inferred value of the target context cannot be determined, the method further includes executing a first step of a sensing plan for acquiring an inferred value of the target context using a rule-based acquisition planner, as well as executing any of a number of subsequent steps of the sensing plan until the inferred value of the target context is obtained.

20 Claims, 9 Drawing Sheets

(56) References Cited

OTHER PUBLICATIONS

Rachuri, et al., "Energy-Accuracy Trade-offs in Querying Sensor Data for Continuous Sensing Mobile Systems", Retrieved at <<http://www.cl.cam.ac.uk/~cm542/papers/ubiworkshop10.pdf>>, Proceedings of Mobile Context-Awareness Workshop, 2010, pp. 1-4.

Meetoo-Appavoo, Anuja, "SmartSense: A Novel Smart and Intelligent Context-Aware Framework", Retrieved at <<http://paper.ijcsns.org/07_book/201108/20110832.pdf>>, International Journal of Computer Science and Network Security (IJCSNS), vol. 11, No. 8, Aug. 2011, pp. 214-221.

Sathan, et al., "Context Aware Lightweight Energy Efficient Framework", Retrieved at <<http://www.waset.org/journals/ijhss/v5/v5-4-37.pdf>>, International Journal of Human and Social Sciences, vol. 5, No. 4, 2010, pp. 249-255.

\* cited by examiner

METHOD FOR RULE-BASED CONTEXT ACQUISITION

BACKGROUND

Many mobile computing devices, such as mobile phones, are configured to utilize a variety of context-aware applications in order to provide dynamic feedback to users. As used herein, the term "context-aware" refers to a capability of certain applications or programs implemented on mobile computing devices to detect, or sense, the changing environment and react appropriately. Such context-aware applications often rely on continuous or frequent sensing of users' context. A user's context may include, for example, information such as a location, a transportation mode, a group state of the user, or a work state of the user, among others. However, acquiring contextual information can be expensive on battery-operated mobile devices, since the sensing of the user's context may consume a large amount of battery power.

SUMMARY

The following presents a simplified summary of the innovation in order to provide a basic understanding of some aspects described herein. This summary is not an extensive overview of the claimed subject matter. It is intended to neither identify key nor critical elements of the claimed subject matter nor delineate the scope of the subject innovation. Its sole purpose is to present some concepts of the claimed subject matter in a simplified form as a prelude to the more detailed description that is presented later.

An embodiment provides a method for rule-based context acquisition. The method includes accepting a request for target context from an application at a context acquisition system and identifying context rules relating to the target context using a rule-based inference cache. The method also includes determining an inferred value of the target context based on previously-acquired contexts and the context rules. If the inferred value of the target context cannot be determined based on the previously-acquired contexts and the context rules, the method further includes executing a first step of a sensing plan for acquiring an inferred value of the target context using a rule-based acquisition planner, wherein first step is determined based on the context rules or a cost, or any combination thereof. The method also includes executing any of a number of subsequent steps of the sensing plan until the inferred value of the target context is obtained, wherein each of the subsequent steps is individually determined based on the context rules, the cost, or a result of a previous step of the sensing plan, or any combinations thereof.

Another embodiment provides a system for rule-based context acquisition. The system includes a rule-based inference cache configured to accept a request for target context from an application and identify context rules relating to the target context, wherein the context rules are stored within the rule-based inference cache. The system also includes a rule-based acquisition planner configured to execute a first step of a sensing plan for acquiring an inferred value of the target context, wherein the first step is determined based on the context rules or a cost, or any combination thereof. The rule-based acquisition planner is further configured to execute a second step of the sensing plan, wherein the second step is determined based on the context rules, the cost, or a result of the first step of the sensing plan, or any combinations thereof.

In addition, another embodiment provides one or more non-transitory computer-readable storage media for storing computer-readable instructions. The computer-readable instructions provide a rule-based context acquisition system when executed by one or more processing devices. The computer-readable instructions include code configured to accept a request for target context from an application and attempt to determine an inferred value of the target context according to context rules relating to the target context using a rule-based inference cache. The computer-readable instructions also include code configured to develop and execute each of a number of steps of a sensing plan using a rule-based acquisition planner if the inferred value is not determined according to the context rules.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Numbers in the 100 series refer to features originally found in FIG. 1, numbers in the 200 series refer to features originally found in FIG. 2, numbers in the 300 series refer to features originally found in FIG. 3, and so on.

DETAILED DESCRIPTION

Embodiments disclosed herein set forth a method and system for determining contextual information using a context acquisition system. A user of a computing device may authorize the context acquisition system to determine the contextual information. In various embodiments, the contextual information may be in the form of a binary value, i.e., true or false. For example, if a particular context relates to whether a user is driving, the value of the context is true if it is determined that the user is driving. Otherwise, the value of the context is false. Furthermore, in some embodiments, the contextual information may be in the form of real values.

The contextual information may include a specific target context requested by a particular context-aware application.

The target context may be determined by the context acquisition system using a rule-based inference cache and a rule-based acquisition planner. The rule-based inference cache may be used to identify context rules relating to the specific target context, wherein the context rules may be combined into a logical expression tree that defines the inference procedure for determining the value of the particular target context. The context rules may include, for example, logical expressions that are used to determine whether a user is outside based on a number of other conditions, such as whether the user is driving, at home, or in a meeting. In various embodiments, the context rules may be general, e.g., whether a user is talking on the phone, or specific, e.g., whether a particular user is talking on the phone with a particular contact, depending on the particular target context. The rule-based inference cache may also include a context rule miner configured to create the context rules that are utilized by the context acquisition system. Moreover, the rule-based acquisition planner may be used to determine and execute a sensing plan for obtaining an inferred value of the target context. The inferred value may be based on both the context rules and sensed context obtained from any of a number of possible sensing procedures.

Figure 1:
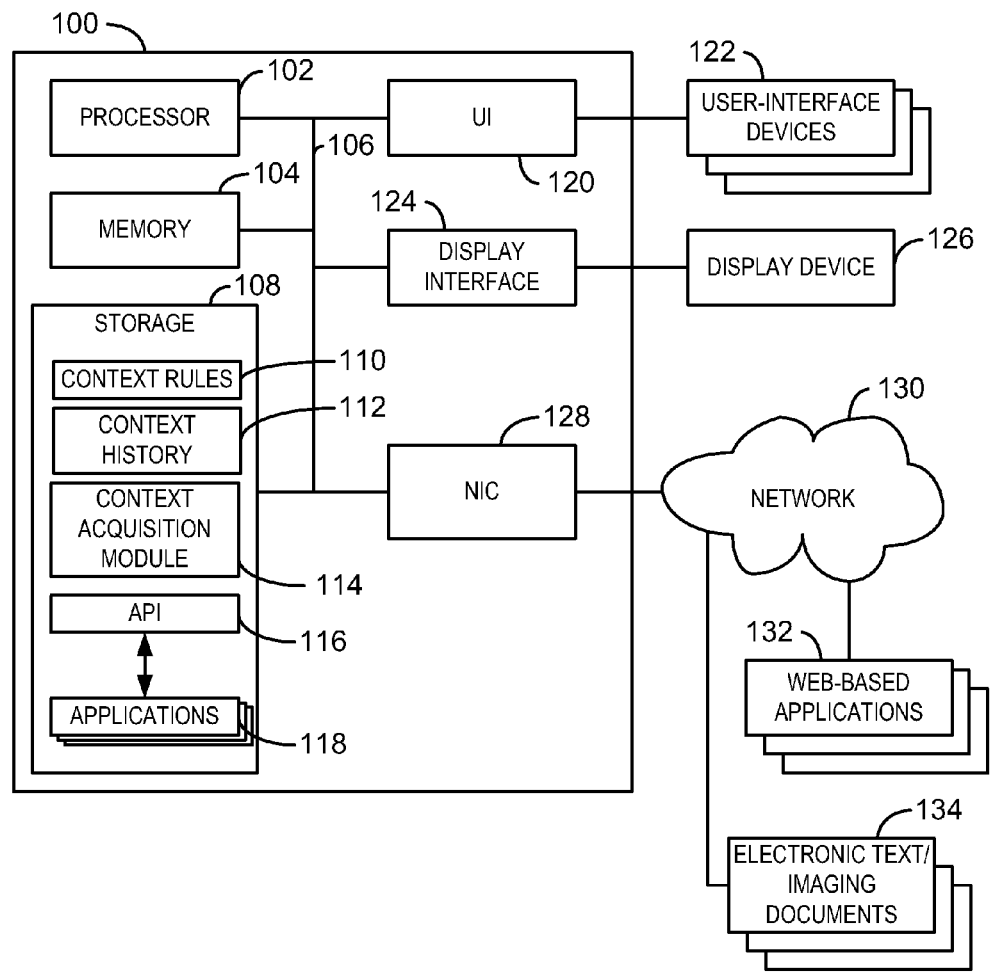
FIG. 1 is a block diagram of an exemplary system that may implement a rule-based context acquisition method.

As a preliminary matter, some of the figures describe concepts in the context of one or more structural components, variously referred to as functionality, modules, features, elements, etc. The various components shown in the figures can be implemented in any manner, for example, by software, hardware (e.g., discreet logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discreet logic components, such as application specific integrated circuits (ASICs), and the like, as well as any combinations thereof.

As to terminology, the phrase "configured to" encompasses any way that any kind of functionality can be constructed to perform an identified operation. The functionality can be configured to perform an operation using, for instance, software, hardware, firmware and the like, or any combinations thereof.

The term "logic" encompasses any functionality for performing a task. For instance, each operation illustrated in the flowcharts corresponds to logic for performing that operation. An operation can be performed using, for instance, software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

FIG. 1 is a block diagram of an exemplary system 100 that may implement a rule-based context acquisition method. The rule-based context acquisition method may be used to reduce the cost of running context-aware applications. In various embodiments, the system 100 may be included within a mobile computing device, such as a mobile phone, a tablet, a personal digital assistant (PDA), an electronic reader, or a media player, among others. Moreover, in some embodiments, the system 100 may be included within any type of computing device which is capable of sensing contextual information for use by context-aware applications or programs implemented by the computing device. An example of a context-aware application is a "location-based reminder" application that is configured to remind a user to perform a certain task when he is at a particular location. Another example is a "running tracker" application that is configured to log how much exercise a user does throughout the day. Further, another example is a "local search/coupon" application that is configured to utilize the user's current location, transportation mode, and grouping state to personalize local search results or coupons delivered to the phone.

The system 100 may include a processor 102 that is adapted to execute stored instructions, as well as a memory device 104 that stores instructions that are executable by the processor 102. The processor 102 may be a single core processor, a multi-core processor, a computing cluster, or any number of other configurations. The memory device 104 can include random access memory (RAM), read only memory (ROM), flash memory, or any other suitable memory systems. These instructions implement a rule-based method for acquiring context information for use by context-aware applications. The processor 102 may be connected through a bus 106 to one or more input and output devices.

The system 100 may also include a storage device 108 adapted to store context rules 110, context history 112, and a context acquisition module 114. The context rules 110 and context history 112 may be used to effectively acquire relevant target context for a variety of context-aware applications. Moreover, the context acquisition module 114 may be used to implement the method for acquiring such target context. The storage device 108 may also be adapted to store an application programming interface (API) 116 and any number of applications 118. The applications 118 may be context-aware applications that communicate with each other through the API 116. The storage device 108 can include a hard drive, an optical drive, a thumbdrive, an array of drives, or any combinations thereof.

A user interface (UI) 120 within the system 100 may connect the system 100 to any number of user interface devices 122, such as a touchscreen, a speaker, or a pointing device, among others. The system 100 may be linked through the bus 106 to a display interface 124 adapted to connect the system 100 to a display device 126, wherein the display device 126 may include a computer monitor or a display screen of a mobile device, among others. Furthermore, a network interface controller (NIC) 128 may be adapted to connect the system 100 through the bus 106 to a network 130 Through the network 130, Web-based applications 132 may be downloaded and stored within the computer's storage device 108, or may be accessed through a Web browser. In various embodiments, the Web-based applications 132 may be context-aware applications. In addition, electronic text and imaging documents 134 may be downloaded through the network 130 for use by the system 100.

Figure 2:
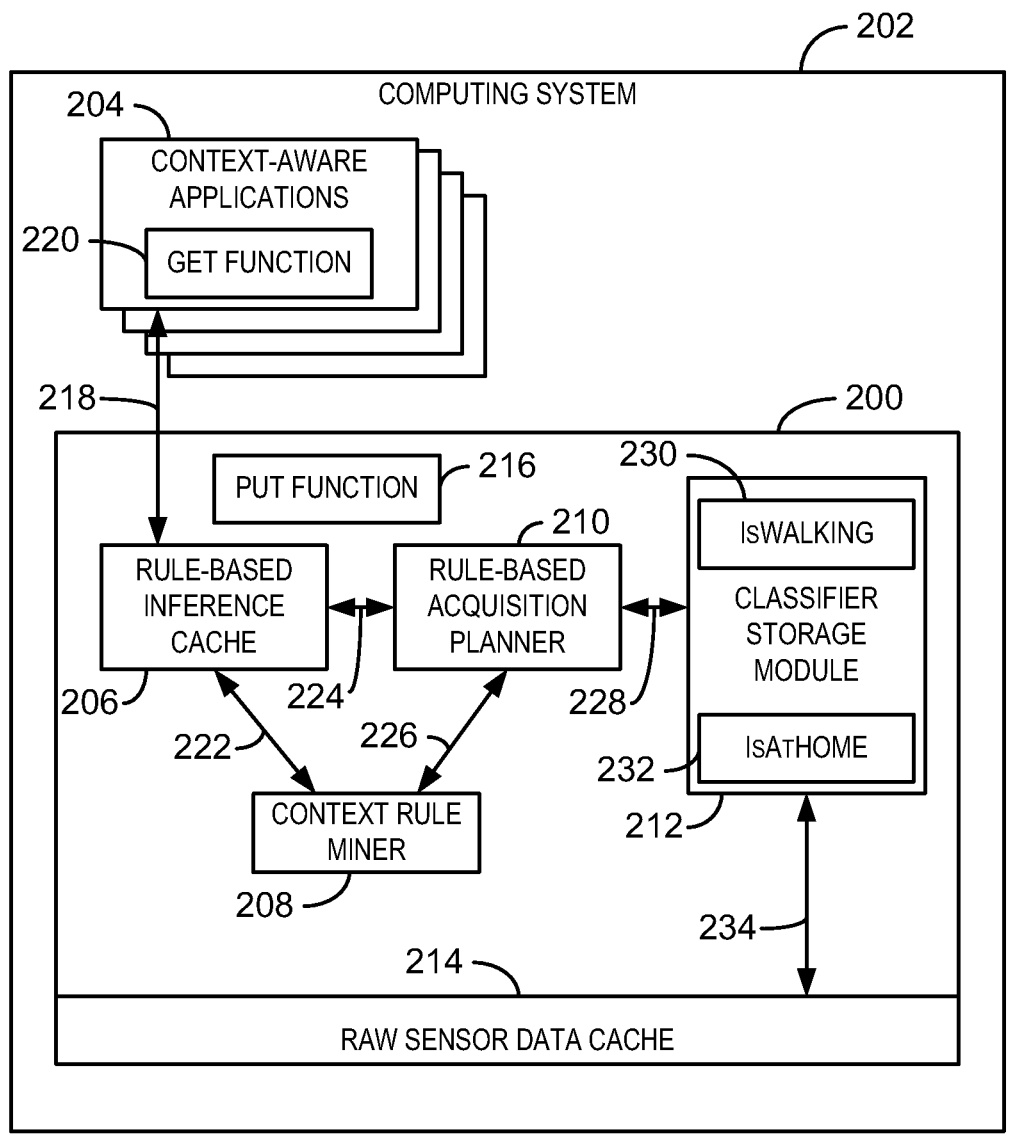
FIG. 2 is an embodiment of a context acquisition system that may be implemented within a computing system.

FIG. 2 is an embodiment of a context acquisition system 200 that may be implemented within a computing system 202. A user of the computing system 202 may authorize the context acquisition system 200 to determine specific contextual information. In various embodiments, the computing system 202 may be included within a mobile computing device or any type of computing device that is configured to sense contextual information and implement context-aware applications or programs. For example, in some embodiments, the computing system 202 may be the system 100 described with respect to FIG. 1. Furthermore, the context acquisition system 200 may be communicably coupled to any number of context-aware applications 204. The context acquisition system 200 may be used to provide the context-aware applications 204 with desired contextual information through a rule-based context acquisition procedure.

In various embodiments, the rule-based context acquisition procedure may be implemented by the context acquisition system 200 using a variety of components. Such components may include a rule-based inference cache 206, a context rule miner 208, a rule-based acquisition planner 210, a classifier storage module 212, and a raw sensor data cache 214, among others. The rule-based inference cache 206 may be used to attempt to infer desired contextual information based on context rules. The context rules may include logical expressions that are used to define the value of a particular target context, such as, for example, whether a user is driving, outside, inside, at home, or in a meeting.

Context rules may be derived using any of a number of data mining algorithms, such as an association rule mining algorithm. For example, in some embodiments, the Apriori algorithm may be utilized to determine context rules using association rule mining techniques. Furthermore, such context rules may be created by the context rule miner 208 based on context history, wherein the context history may include sensing data from previous instances of the context acquisition procedure. Moreover, the context rules may also be created by the context rule miner 208 in response to input from a developer of the context acquisition system 200 or, in some embodiments, in response to direct input from a user of the computing system 202.

The context acquisition system 200 may rely on input from the context-aware applications 204 in order to generate the context rules within the context rule miner 208. For example, in various embodiments, a "put function" 216 may be used to populate context history within the context acquisition system 200. The put function 216 may involve accepting information relating to specific contextual information, as well as the corresponding value of such contextual information, at the rule-based inference cache 206, as indicated by the arrow 218. The rule-based inference cache 206 may record the value of the specific contextual information for future usage. Moreover, the rule-based inference cache 206 may also send the value of the specific contextual information to the context rule miner 208 to be used for the generation of new context rules. In various embodiments, the specific contextual information that is obtained from the put function 216 may be referred to as "context history."

The rule-based inference cache 206 may initiate the context acquisition procedure in response to a "get function" 220. The get function 220 may involve accepting a request for specific contextual information from a context-aware application 204 at the rule-based inference cache 206, as indicated by the arrow 218. The get function 220 may include information relating to the desired contextual information, or "target context." The rule-based inference cache 206 may search local files in order to determine whether the value of the target context is already present within the rule-based inference cache 206. If the exact value of the target context is identified within the rule-based inference cache 206, it may be automatically returned to the context-aware application 204. However, if the exact value of the target context is not found within the rule-based inference cache 206, the rule-based inference cache 206 may directly query the context rule miner 208 to determine whether appropriate context rules are available for acquiring the target context, as indicated by the arrow 222. Moreover, the rule-based inference cache 206 may also forward the request for the target context to the rule-based acquisition planner 210, as indicated by the arrow 224.

The rule-based acquisition planner 210 may develop a plan for acquiring the specific target context based on the context history and the available sensors within the computing system. The rule-based acquisition planner 210 may be communicably coupled to the context rule miner 208 and may communicate with the context rule miner 208 in order to obtain context rules relating to the target context, as indicated by the arrow 226. The rule-based acquisition planner 210 may use the appropriate context rules in order to create a sensing plan for acquiring the target context. In some embodiments, the sensing plan may be sent to the classifier storage module 212, as indicated by the arrow 228, in order to identify corresponding classifiers for each sensing procedure specified by the sensing plan. For example, the classifier specified by the sensing plan may be an "Is Walking" classifier 230 or an "Is At Home" classifier 232. Moreover, the classifier storage module 212 may include a library of classifiers relating to a variety of contextual information.

The classifier storage module 212 and the raw sensor data cache 214 may be communicably coupled and configured to exchange information relating to the classifiers, as indicated by the arrow 234. For example, the appropriate classifier may be sent from the classifier storage module 212 to the raw sensor data cache 214. The raw sensor data cache 214 may determine whether the result of the requested sensing procedure is already contained within the cache 214. If the result of the requested sensing procedure is found, the result may be returned to the rule-based acquisition planner 210 and used to determine the next step of the sensing plan. However, if the result of the requested sensing procedure is not found, the computing system 202 may utilize any of a variety of sensors to obtain the contextual information relating to the specific classifier. For example, if the Is Walking classifier 230 has been specified by the rule-based acquisition planner 210, the accelerometer or global positioning system (GPS) may be probed to deduce whether a user of the computing system 202 is walking. As another example, if the Is At Home classifier 232 has been specified, the microphone, GPS, or accelerometer may be probed to deduce whether the user of the computing system 202 is at home. Moreover, in various embodiments, the classifier storage module 212 or the raw sensor data cache 214, or both, may be included within the rule-based acquisition planner 210.

In various embodiments, once the value of the target context has been determined by the context acquisition system 200, the value may be returned to the context-aware application 204 that initiated the get function 220. The target context may be utilized to aid in the functioning of the context-aware application 204 and may allow the context-aware application 204 to provide dynamic feedback to the user of the computing system 202. Moreover, the behavior of the context-aware application 204 may be altered in response to the value of the target context according to the specific application or environment.

It is to be understood that the context acquisition system 200 is not limited to the configuration shown in FIG. 2. Rather, the components of the context acquisition system 200 may be arranged in any of a number of possible configurations. For example, in various embodiments, the context rule miner 208 may be included within the rule-based inference cache 206. In some embodiments, the put function 216 and the get function 220 may be implemented within the computing system 202 via an application programming interface (API). Moreover, not all of the components of the context acquisition system 200 described with respect to FIG. 2 are to be present in every case, and any number of additional components may be included within the system 200.

Figure 3:
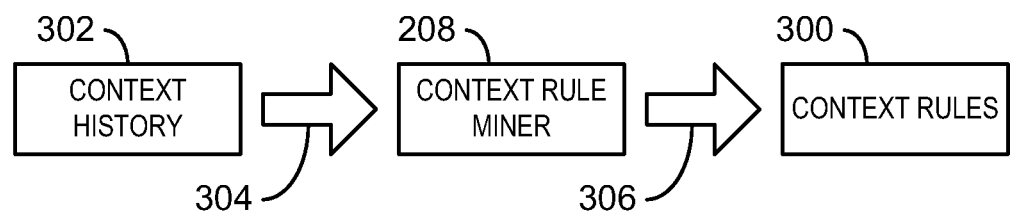
FIG. 3 is an embodiment of the context rule miner that may be used within the context acquisition system to create rules for inferring contextual information.

FIG. 3 is an embodiment of the context rule miner 208 that may be used within the context acquisition system 200 to create rules for inferring contextual information. Like numbered items are as described with respect to FIG. 2. The context rule miner 208 may be used to create a variety of context rules 300 relating to contextual information obtained by the computing system 202, wherein such contextual information may be referred to as context history 302. The context history 302 may be obtained by the computing system 202 using any of a variety of sensors, including a GPS, an accelerometer, a microphone, a Wi-Fi connection, or a touchscreen, among others. Moreover, in various embodiments, the context history 302 may be the input for the context rule miner 208, as indicated by the arrow 304, while the context rules 300 may be output of the context rule miner 208, as indicated by the arrow 306.

Furthermore, in some embodiments, context rules 300 may be created by the context rule miner 208 in response to input from a developer of the context acquisition system 200 or in response to direct input from a user of the computing system 202. Context rules that are preprogrammed by the developer of the context acquisition system 200 may be referred to as "universal context rules," while context rules that are created in response to an input of a specific user may be referred to as "personal context rules." Moreover, in various embodiments, a particular computing system may be bootstrapped with the universal context rules during the manufacturing process, while the personal context rules may be learned by the computing system over time as a user's characteristics, environment, or preferences are established.

Figure 4:
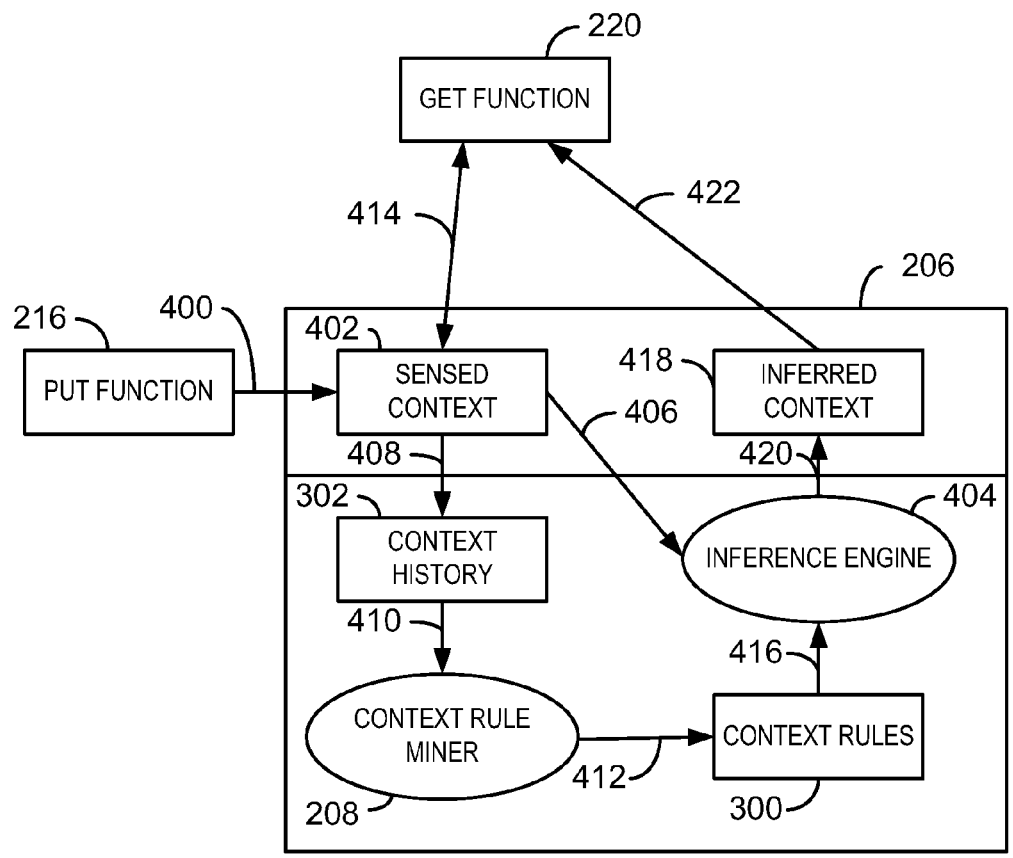
FIG. 4 is an embodiment of the rule-based inference cache that may be used within the context acquisition system to provide contextual information via inference.

FIG. 4 is an embodiment of the rule-based inference cache 206 that may be used within the context acquisition system 200 to provide contextual information via inference. Like numbered items are as described with respect to FIGS. 2 and 3. As discussed with respect to FIG. 2, the rule-based inference cache 206 may utilize contextual information obtained from the put function 216, as indicated by the arrow 400. Such contextual information may include sensed context 402 acquired from any of a number of sensors found within the computing system 202. In various embodiments, the value of the sensed context 402 may be stored within an inference engine 404, as indicated by the arrow 406, in order to allow for the automatic return of subsequent target contexts having the same value. Moreover, the sensed context 402 may be stored within the rule-based inference cache 206 as the context history 302, as indicated by the arrow 408. In various embodiments, the context rule miner 208 may be included within the rule-based inference cache 206 and may directly accept the context history 302 as input, as indicated by the arrow 410, and produce the context rules 300 as output, as indicated by the arrow 412.

As discussed with respect to FIG. 2, the rule-based inference cache 206 may initiate the context acquisition procedure in response to a request for specific target context obtained from the get function 220. In various embodiments, the get function 220 may send the request for the specific target context directly to the rule-based inference cache 206, as indicated by the arrow 414. The rule-based inference cache 206 may search the sensed context to determine whether an exact value of the target context has already been obtained. If the exact value of the target context is not found, the rule-based inference cache 206 may forward the request to the inference engine 404. In various embodiments, the inference engine 404 may be configured to utilize the context rules 300 generated by the context rule miner 208, as indicated by the arrow 416. The inference engine 404 may be used to generate inferred context 418 based on the context rules 300 and the sensed context 402, as indicated by the arrow 420. In various embodiments, the inferred context 418 may be equal to the inferred value of the target context. Moreover, the inferred context 418 that is generated by the inference engine 404 may be output as the value of the target context requested by the get function 220, as indicated by the arrow 422.

In various embodiments, the rule-based inference cache 206 may use the context rules 300 generated by the context rule miner 208 to create logical expression, or logical operation, trees that define specific context rules for each possible context value. For example, a particular logical expression tree may specify context rules for a particular inferred value of the target context. Each logical expression tree may include a combination of multiple related context rules 300. Moreover, the logical expression trees may be based on Boolean expressions, wherein Boolean expressions are logical expressions that produce a value of true or false when evaluated. In some embodiments, the logical expression tree may be an AND/OR tree, as described below with respect to FIG. 5.

Figure 5:
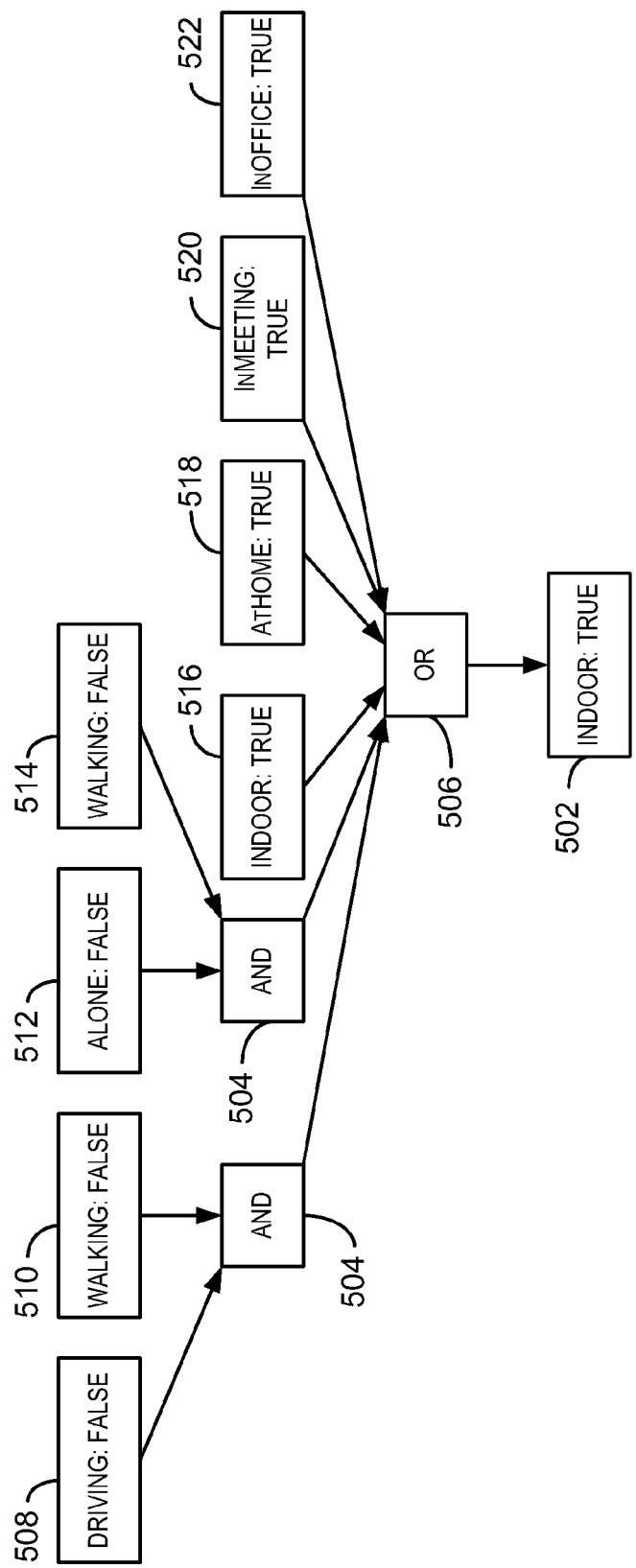
FIG. 5 is a schematic of an AND/OR tree that may be utilized by the rule-based inference cache to define rules for inferring specific contextual information.

FIG. 5 is a schematic of an AND/OR tree 500 that may be utilized by the rule-based inference cache 206 to define rules for inferring specific contextual information. Like numbered items are as described with respect to FIGS. 2, 3, and 4. The AND/OR tree 500 may be used to define an "Indoor: True" target context value 502, wherein the Indoor: True target context value 502 indicates that a user is indoors. However, the rule-based inference cache may include a similar AND/OR tree for each target context value. For example, there may be a separate AND/OR tree for the "Indoor: False" target context value.

The AND/OR tree 500 may provide a logical definition for the Indoor: True target context value 502 based on logical operations. The logical operations may be performed using logical operators, including an AND operator 504 and an OR operator 506. The AND operator 504 may indicate that positive, or "true," results for both of two possible values establish a positive, or true, result for the AND operation. For example, a "Driving: False" context value 508 and a "Walking: False" context value 510 constitute a positive result for the AND operation. As another example, an "Alone: False" context value 512 and a "Walking: False" context value 514 may also constitute a positive result for the AND operation, as indicated in FIG. 5.

The OR operator 506 may indicate that a positive, or true, result for any of two or more possible values establishes a positive, or true, result for the OR operation. Therefore, if one of the possible context values branching from the OR operator 506 is true, it may be verified that the Indoor: True target context value 502 is also true. For example, if an Indoor: True context value 516 is true, it follows that the Indoor: True target context value 502 is true. Moreover, it may be inferred that, if an "At Home: True" context value 518, an "In Meeting: True" context value 520, or an "In Office: True" context value 522 is true, the Indoor: True target context value 502 is also true. This inference may be based on the fact that it is either highly unlikely or impossible that a user may be at home, in a meeting, or in their office and be outside at the same time. Therefore, the user may be inferred to be indoors. Furthermore, the user may also be inferred to be indoors if the user is neither driving nor walking, or is neither alone nor walking.

In various embodiments, the AND/OR tree 500 may be tailored to the specific personal and environmental characteristics of each user. Additionally, some logical elements within the AND/OR tree 500 may be assumed to be universal and may be preprogrammed into a user's computing device prior to the collection of any sensed context 402. For example, it may be universally assumed that, if a user is driving, the user may not also be walking.

In some embodiments, logical expression trees, such as the AND/OR tree 500, may be normalized to produce shorter versions of the logical expression trees. For example, standard rules of Boolean expressions may be utilized to eliminate any redundancies within the logical expression trees. This may be accomplished by alternating AND levels and OR levels within the logical expression trees, or by absorbing or collapsing redundant expressions within the logical expression trees.

Figure 6:
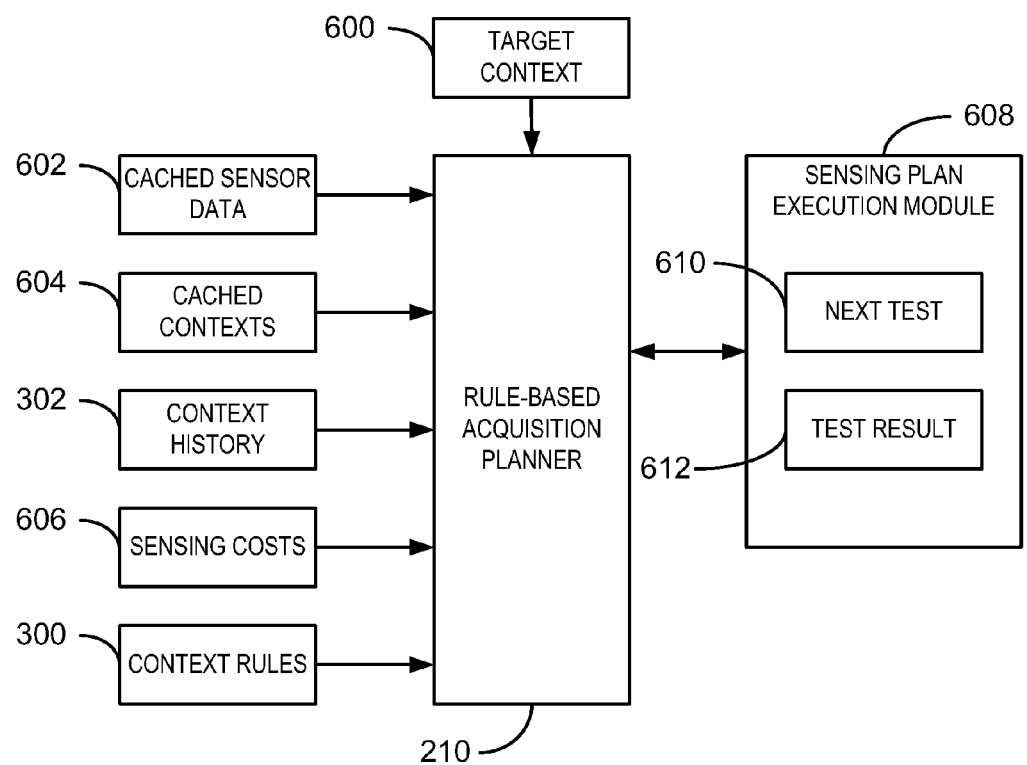
FIG. 6 is an embodiment of a rule-based acquisition planner that may be used within the context acquisition system to create a sensing plan for acquiring contextual information.

FIG. 6 is an embodiment of a rule-based acquisition planner 210 that may be used within the context acquisition system 200 to create a sensing plan for acquiring contextual information. Like numbered items are as described with respect to FIGS. 2, 3, 4, and 5. The rule-based acquisition planner 210 may receive a request for specific target context 600 from the rule-based inference cache 206 or directly from a context-aware application 204. Moreover, the rule-based acquisition planner 210 may receive a variety of inputs, such as cached sensor data 602, cached contexts 604, the context history 302, sensing costs 606, or the context rules 300, or any combinations thereof. The cached sensor data 602 may include stored data relating to sensed context 402 obtained from multiple instances of the put function 216. The cached contexts 604 may include data relating to inferred contexts 418 obtained from multiple instances of the get function 220.

The sensing costs 606 may include computing costs or battery costs for each of a variety of possible sensing procedures. Further, each sensor may have a specified cost of operation. In various embodiments, for example, the computing cost for the GPS sensor may be higher than the computing cost for the microphone sensor.

The rule-based acquisition planner 210 may utilize a conditional planning technique in order to provide a dynamic sensing plan. In some embodiments, the rule-based acquisition planner 210 may develop the sensing plan according to a dynamic programming-based solution, such as, for example, an association rule mining algorithm. The sensing plan may be implemented by a sensing plan execution module 608 that is communicably coupled to the rule-based acquisition planner 210. The sensing plan execution module 608 may be configured to execute sensing procedures within the computing system 202. The sensing procedures may include, for example, determining a GPS location using a GPS device, measuring an acceleration using an accelerometer, or determining whether multiple people are present in a room using a microphone.

Moreover, the conditional planning technique may involve selecting a "next test" function 610, wherein the next test function 610 may specify the next step in the sensing plan. In some embodiments, each step of the sensing plan may be determined by the rule-based acquisition planner 210 based on the sensing costs 606, the context rules 300, and a result of the previous step of the sensing plan. The result of the previous step of the sensing plan may be provided to the rule-based acquisition planner 210 by a "test result" function 612. Furthermore, the cached sensor data 602, the cached contexts 604, or the context history 302, or any combinations thereof, may also be utilized by the rule-based acquisition planner 210 to determine each step in the sensing plan. In some embodiments, the next test function 610 and the test result function 612 may be implemented by the sensing plan execution module 608.

Figure 7:
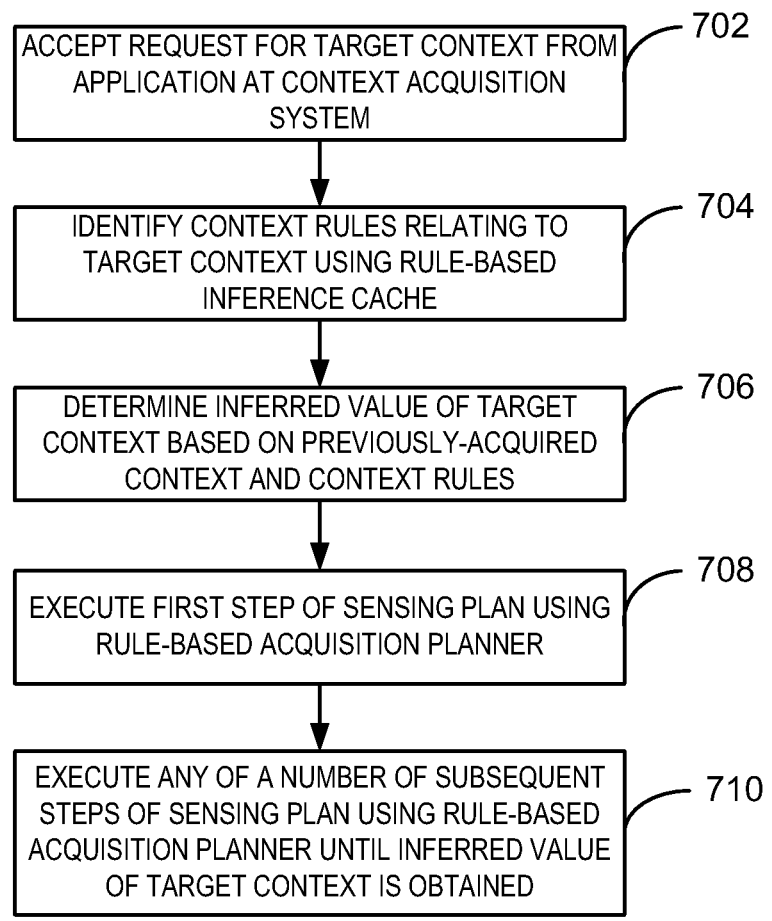
FIG. 7 is a process flow diagram showing a method for rule-based context acquisition within a mobile computing environment.

FIG. 7 is a process flow diagram showing a method 700 for rule-based context acquisition within a mobile computing environment. The mobile computing environment may include any type of mobile device or system that is capable of implementing context-aware applications or programs. Moreover, in some embodiments, the method 700 may be used for rule-based context acquisition within non-mobile computing environments, such as a computing system within a home, a television, or a desktop computer, among others.

In various embodiments, the context that may be acquired, or inferred, according to the method 700 may include any type of non-deterministic, or variable, information relating to an environment, characteristic, or preference of a particular user. The method 700 may be used to provide a specific application with a desired target context. For example, an application may desire to know whether a user is inside or outside, at home or in a meeting, or driving or walking. The application may acquire such contextual information according to the method 700 by sending a request for each specific target context. For example, one target context may be whether the user is outside, while another target context may be whether the user is in a meeting. Moreover, the value of each target context may be true or false. For example, if the user is outside, the value of the corresponding target context may be true. In various embodiments, the method 700 may produce an inferred value of the target context, since an exact value of the target context may not be available. The inferred value of the target context may be based on specific context rules relating to the target context.

The method 700 begins at block 702 with the acceptance of a request for a target context from an application at a context acquisition system. The request may specify the particular target context that is desired by the application. In various embodiments, the application may communicate with the context acquisition system via an application programming interface (API), wherein the API may be stored within the mobile computing environment. Specifically, the application may communicate directly with the rule-based inference cache or the rule-based acquisition planner, or both, via the API.

At block 704, context rules relating to the target context may be identified using a rule-based inference cache. The context rules relating to the target context may include a number of context rules generated by a context rule miner and organized by a rule-based inference cache according to a relationship between each of the context rules with regard to the target context. Moreover, the rule-based inference cache may be a component within the context acquisition system and may include a context rule miner and an inference engine. The context rule miner may be used to generate context rules based on context history, wherein the context history may be determined using sensed context. The sensed context may include data obtained from sensing procedures. In various embodiments, a sensing procedure may include any procedure involving the use of a sensor within the mobile computing environment. Examples of sensors include a GPS device, an accelerometer, a speaker, a microphone, a touchscreen, a camera, a light indicator, or a Wi-Fi connection, among others.

In some embodiments, the rule-based inference cache may utilize the context rules generated by the context rule miner to create a logical expression tree for each possible target context. A logical expression tree may be a flow chart that defines a particular target context based on logical operations. The logical operations may be used to determine a value for the target context based on inference. Inferring the value of the target context may reduce the computing costs or battery costs for determining the target context by reducing the number of sensing procedures that are executed. In some embodiments, if the exact value of the target context is contained within the rule-based inference cache, the exact value may be automatically returned to the application.

At block 706, an inferred value of the target context may be determined based on previously-acquired contexts and the context rules relating to the target context. The previously-acquired contexts may include, for example, context history and preprogrammed contexts included by the developer. If the inferred value of the target context may be obtained without executing any sensing procedures, the method 700 may end at block 706, and an inferred value of the target context may be returned to the application. In some embodiments, the exact value or the inferred value of the target context may be sent from the context acquisition system to the application via the API. However, if the exact value or the inferred value of the target context is not directly determined by the rule-based inference cache, the method 700 may continue at block 708.

At block 708, a first step of a sensing plan may be executed by a rule-based acquisition planner. The first step of the sensing plan may be determined based on the context rules relating to the target context or a cost, or any combination thereof. The cost may include a computing cost or an energy, or battery, cost of obtaining sensor data relating to the target context. The first step may include a first sensing procedure that may be performed in order to gain sensor data relating to the target context. Moreover, the first step may be chosen such that the identified context rules relating to the target context may be augmented in a manner that increases the likelihood of obtaining the inferred value of the target context. Additionally, the first step may be chosen at least in part according to which sensing procedures are low in cost. In various embodiments, if the inferred value of the target context is determined from the first step of the sensing plan, the inferred value may be returned to the application. Otherwise, the method 700 may continue at block 710.

At block 710, any of a number of subsequent steps of the sensing plan may be executed by the rule-based acquisition planner until the inferred value of the target context is obtained. Each step may include a sensing procedure that may be performed in order to gain sensed context relating to the target context using any of a number of sensors implemented within the mobile computing environment or computing device. Each subsequent step may be individually determined based on context rules relating to the target context, the cost, or a result of a previous step of the sensing plan, or any combinations thereof. In some embodiments, for example, a logical expression tree for the target context may be utilized to determine a next step of the sensing plan. The result of each previous step may be utilized by the rule-based acquisition planner in order to determine a next sensing procedure that may augment the sensor data from the previous sensing procedure in a manner that increases the likelihood of obtaining the inferred value of the target context. Moreover, in some embodiments, the first step and the subsequent steps of the sensing plan may be chosen such that the steps are executed according to the cost in an ascending order, starting with the lowest-cost step.

In various embodiments, the context acquisition system may attempt to determine the inferred value of the target context after each step of the sensing plan. Moreover, the rule-based acquisition planner may continue to generate a next step of the sensing plan until the inferred value is determined. Once the inferred value is obtained, it may be output to the application that initiated the instance of the method 700.

In some embodiments, two sequential steps, e.g., the first step and the second step, of the sensing plan may be considered to be concurrent, or co-occurring, if the steps are executed within a specified window of time. The specified window of time may be referred to as a "basket size." The basket size may be dynamically altered according to the specific target context, or according to the specific sensing procedures specified by the steps. For example, it may be inferred that a user is walking if the user was walking within the last five minutes. However, it may not be inferred that a user is talking on the phone because the user was talking on the phone within the last five minutes.

In various embodiments, the rule-based acquisition planner may determine each step of the sensing plan based on the following pseudo code:

```
procedure Init(X)
    trace ← φ
    next ← φ
    target ← X
    result ← φ
    dpCache ← φ
procedure Result
    return result
procedure Update(attrib,value)
    trace ← trace ∪ [attrib = value]
    if attrib = target then
        result ← value
```

```
procedure Next
    if result = φ then
        return φ
    (attrib,cost) ← NextHelper(trace)
    return attrib
procedure NextHelper (trace)
    if trace is in dpCache then
        [next,cost] ← dpCache[trace]
        return [next,cost]
    minCost ← ∞
    bestAttrib ← φ
    for all State s ∉ trace do
        traceT ← trace ∪ [s = true]
        if traceT satisfies expressionTree(target = true) then
            CostT ← 0
        else
            [next,cosT] ← GetNextHelper(traceT)
        traceF ← trace ∪ [s = false]
        if traceF satisfies expressionTree(target = false) then
            CostF ← 0
        else
            [next,costF] ← GetNextHelper(traceF)
        ExpectedCost ← Cost(s) + Prob(s = true)CostT + Prob(s = falseCostF
        if ExpectedCost < minCost then
            minCost ← ExpectedCost
            bestAttrib ← s
    dpCache[trace] ← [bestAttrib, minCost]
    return [bestAttrib, minCost]
```

According to the above pseudo code, the "Init(X)" procedure may be utilized to initialize the rule-based acquisition planner for the desired target attribute, or target context, X. A trace of the sensing plan may be updated to include the returned value of the sensed context (attrib) of a previous step of the sensing plan using the "Update" procedure. The "Next" procedure may then be used to determine a next step of the sensing plan based on the returned value of the sensed context (attrib) and the cost (cost) of obtaining the next step. Furthermore, the "NextHelper" procedure may be utilized to help determine the next step of the sensing plan. For each of the possible steps that may be used to determine a state (s) of a particular sensed context, the "NextHelper" procedure may be used to determine whether the value of the specific trace is already known and is located in cache. If the value of the trace is known, the cost of determining the target context defined by that trace is zero. Otherwise, if the value of the trace is not known, the "NextHelper" procedure may determine the next step of the sensing plan based on the sensing procedure that is predicted to produce the most useful sensed context (bestAttrib) at the lowest cost (minCost). In various embodiments, the rule-based acquisition planner may continuously plan and execute steps of the sensing plan until the expression tree for the target context is satisfied, and the target context may be inferred.

The method 700 is not intended to indicate that the steps of the method 700 are to be executed in any particular order or that all of the steps are to be included in every case. Further, steps may be added to the method 700 according to the specific application. For example, in some embodiments, redundant context rules may be suppressed within the rule-based inference cache in order to simplify the method 700. Such a suppression of redundant rules may be accomplished by removing specific logical expressions or operations from the logical expression tree for a particular target context. Moreover, the logical expression tree may be continuously or periodically updated or altered according to new context rules generated by the context rule miner within the rule-based inference cache.

Figure 8:
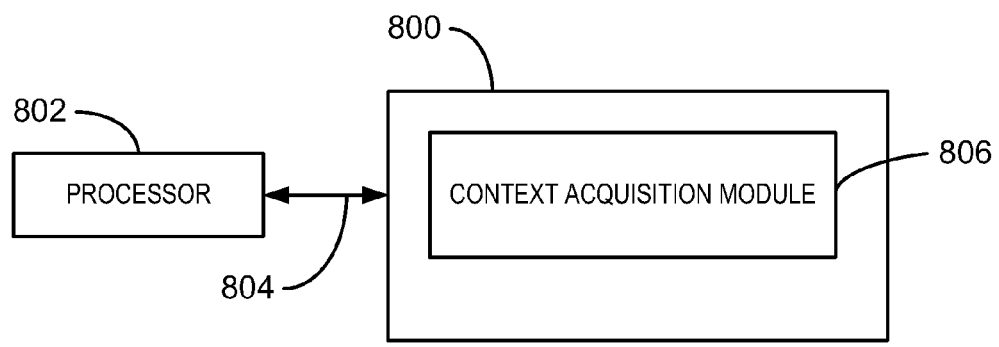
FIG. 8 is a block diagram showing a tangible, computer-readable medium that stores code adapted to acquire contextual information for use by context-aware applications within a computing environment.

FIG. 8 is a block diagram showing a tangible, computer-readable medium 800 that stores code adapted to acquire contextual information for use by context-aware applications within a computing environment. The tangible, computer-readable medium 800 may be accessed by a processor 802 over a computer bus 804. Furthermore, the tangible, computer-readable medium 800 may include code configured to direct the processor 802 to perform the steps of the current method. The various software components discussed herein may be stored on the tangible, computer-readable medium 800, as indicated in FIG. 8. For example, a context acquisition module 806 may be configured to implement a method for inferring contextual information based on any of a number of context rules, or acquiring contextual information based on a rule-based acquisition plan. In various embodiments, the rule-based acquisition plan may rely on both inference and sensing techniques to efficiently determine the desired contextual information. Further, the tangible, computer-readable medium 800 may also include any number of additional software components not shown in FIG. 8.

Figure 9:
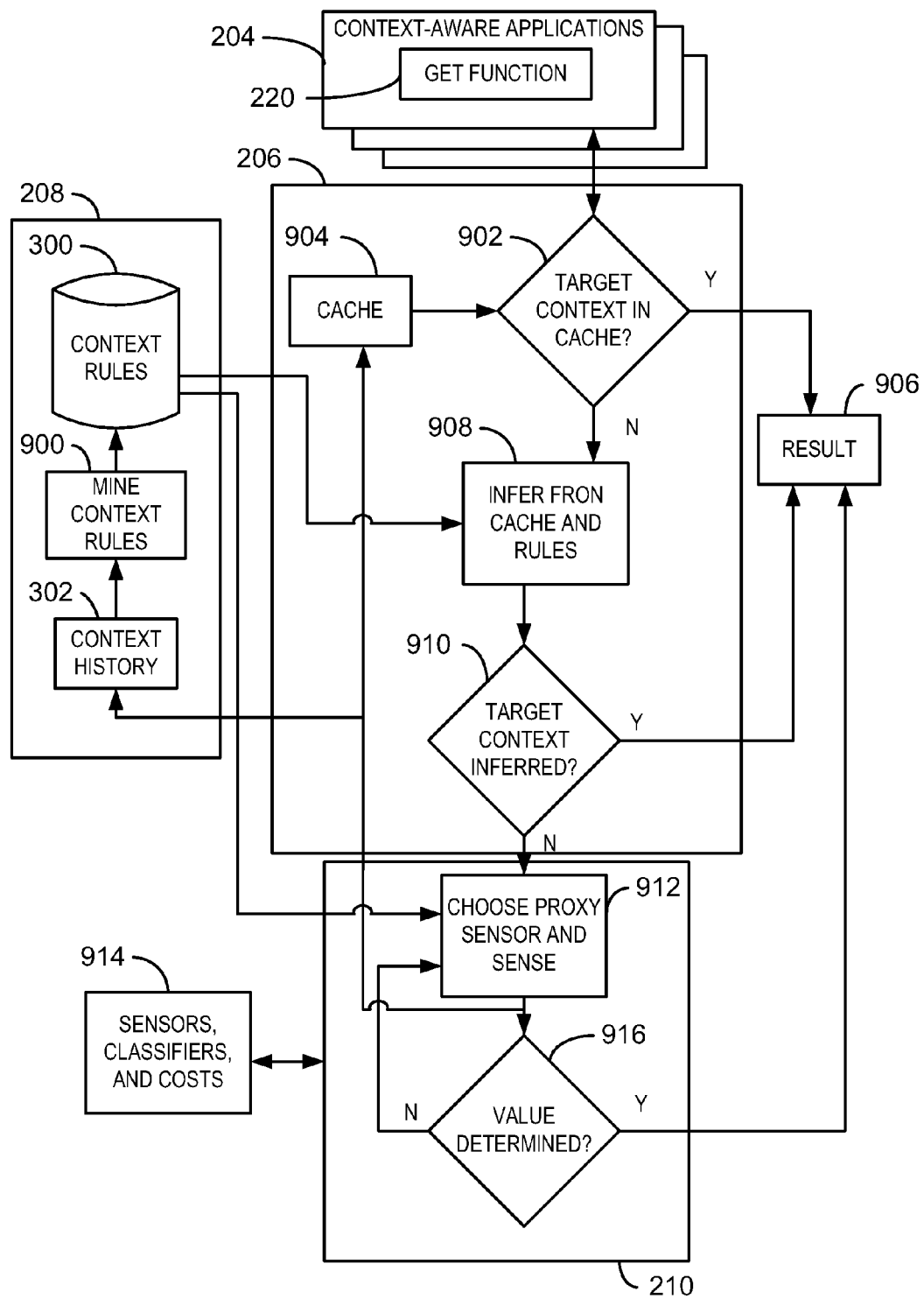
FIG. 9 is a block diagram of an exemplary embodiment of the context acquisition system.

FIG. 9 is a block diagram of an exemplary embodiment of the context acquisition system 200. Like numbered items are as described with respect to FIGS. 2 and 3. In various embodiments, the context rule miner 208 described with respect to FIG. 3 may include a storage device or a memory devices that is configured to store the context history 302 and the context rules 300. The context rule miner 208 may be configured to utilize the context history 302 to generate the context rules 300 by performing a mining procedure, as indicated by block 900.

In various embodiments, the get function 220 may involve accepting a request for specific contextual information from a context-aware application 204 at the rule-based inference cache 206, as described with respect to FIG. 2. At block 902, the rule-based inference cache 206 may determine whether the desired target context is located in a cache 904. If the target context is found within the cache 904, it may be output as result 906. In some embodiments, the result 906 may be sent directly to the specific context-aware application 204 that requested the target context.

If the target context is not found within the cache 904, the rule-based inference cache 206 may attempt to infer the target context from the cache 904 and the context rules 300 at block 908. At block 910, the rule-based inference cache 206 may determine whether the desired target context has been successfully inferred at block 908. If the target context has been inferred, it may be output as the result 906.

If the target context has not been inferred, a proxy sensor may be chosen and used to perform a step of the sensing plan at block 912 within the rule-based acquisition planner 210. In various embodiments, sensors, classifiers, and costs 914, as well as the context rules 300, may be used to determine the proxy sensor at block 912. The output of the step of the sensing plan may be sent to the cache 904 in order to be used as additional contextual information for the next instance of the context acquisition system 200.

At block 916, the rule-based inference cache 206 may determine whether the value of the desired target context has been successfully determined from the step of the sensing plan. If the target context has been determined, it may be output as the result 906. If the target context has not been determined, a next proxy sensor may be chosen and used to perform a next step of the sensing plan at block 912 within the rule-based acquisition planner 210. This may be repeated for any number of steps of the sensing plan until the target context has been successfully determined by the context acquisition system 200.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for rule-based context acquisition, comprising:
   accepting a request for a target context from an application at a context acquisition system;
   identifying context rules relating to the target context using a rule-based inference cache;
   determining an inferred value of the target context based on previously-acquired contexts and the context rules without initializing sensor procedures as a result of the request; and
   if the inferred value of the target context cannot be determined based on the previously-acquired contexts and the context rules, executing a first step of a sensing plan for acquiring the inferred value of the target context using a rule-based acquisition planner, wherein the first step is determined based on the context rules or a cost, or any combination thereof; and
   executing any of a plurality of subsequent steps of the sensing plan until the inferred value of the target context is obtained, wherein each of the plurality of subsequent steps is individually determined based on the context rules, the cost, or a result of a previous step of the sensing plan, or any combinations thereof.

2. The method of claim 1, comprising outputting an exact value of the target context to the application if the exact value is found within the context acquisition system.

3. The method of claim 1, comprising outputting the inferred value of the target context to the application.

4. The method of claim 1, wherein the application comprises a context-aware application implemented within a mobile computing device.

5. The method of claim 1, comprising creating the context rules within a context rule miner and combining the context rules relating to the target context within the rule-based inference cache to create a logical expression tree for the target context.

6. The method of claim 5, comprising using the logical expression tree to determine the sensing plan for acquiring the inferred value of the target context.

7. The method of claim 1, wherein the executing the first step or any of the plurality of subsequent steps of the sensing plan comprises obtaining sensed context relating to the target context using a sensor implemented within a computing device.

8. The method of claim 1, wherein the cost comprises a computing cost or a battery cost, or both, of obtaining sensor data related to the target context, and wherein the first step and the plurality of subsequent steps of the sensing plan are chosen such that steps are executed according to the cost in an ascending order.

9. The method of claim 1, comprising generating the context rules according to context history obtained from sensed context within the rule-based inference cache using a context rule miner.

10. A system for rule-based context acquisition, comprising:
    a rule-based inference cache configured to:
       accept a request for a target context from an application; and
       identify context rules relating to the target context, wherein the context rules are stored within the rule-based inference cache;
       determining an inferred value of the target context based on previously-acquired contexts and the context rules without initializing sensor procedures as a result of the request; and
    a rule-based acquisition planner configured to:
       execute a first step of a sensing plan for acquiring the inferred value of the target context if the inferred value of the target context cannot be determined based on the previously-acquired contexts and the context rules, wherein the first step is determined based on the context rules or a cost, or any combination thereof; and
       execute a second step of the sensing plan, wherein the second step is determined based on the context rules, the cost, or a result of the first step of the sensing plan, or any combinations thereof.

11. The system of claim 10, wherein the cost comprises a computing cost or an energy cost, or both, of obtaining sensor data relating to the target context.

12. The system of claim 10, wherein the application comprises an application that utilizes contextual information.

13. The system of claim 10, wherein the system is configured to output the inferred value of the target context to the application once it is obtained.

14. The system of claim 10, wherein the context rules comprise a plurality of context rules relating to the target context organized in a logical expression tree, and wherein the logical expression tree specifies context rules for a particular inferred value of the target context.

15. The system of claim 10, wherein the first step and the second step of the sensing plan comprise any of a plurality of sensing procedures performed using a sensor within a computing device.

16. The system of claim 10, wherein the first step and the second step of the sensing plan may be considered to be concurrent if the first step and the second step are executed within a specified window of time, and wherein the specified window of time comprises a basket size.

17. The system of claim 10, comprising an application programming interface (API) configured to communicably couple the rule-based inference cache or the rule-based acquisition planner, or both, to the application.

18. One or more computer-readable storage media for storing computer-readable instructions, the computer-readable instructions providing a rule-based context acquisition system when executed by one or more processing devices, the computer-readable instructions comprising code configured to:
    accept a request for a target context from an application;
    attempt to determine an inferred value of the target context according to context rules relating to the target context using a rule-based inference cache without initializing sensor procedures as a result of the request; and
    if the inferred value is not determined according to the context rules, develop and execute each of a plurality of steps of a sensing plan using a rule-based acquisition planner until the inferred value is determined.

19. The one or more computer-readable storage media of claim 18, wherein each of the plurality of steps of the sensing plan is determined based on the context rules relating to the target context, a computing cost, or a result of a previous step of the sensing plan, or any combinations thereof.

20. The one or more computer-readable storage media of claim 18, wherein the context rules relating to the target context comprise a plurality of context rules generated by a context rule miner and organized by the rule-based inference cache according to a relationship between each of the plurality of context rules with regard to the target context.

* * * * *